ENCODER SYSTEMS

Filed Jan. 11, 1962

2 Sheets-Sheet 1

Kenneth M. Uglow, Jr.
INVENTOR.

BY Michael P. Breston

Kenneth M. Uglow, Jr.
INVENTOR.
BY Michael P. Breston 3,189,893
ENCODER SYSTEMS

Kenneth M. Uglow, Jr., Sarasota, Fla., assignor to Electro-Mechanical Research, Inc., Sarasota, Fla., a corporation of Connecticut Filed Jan. 11, 1962, Ser. No. 165,701
5 Claims. (Cl. 340—347)

Figure 1:
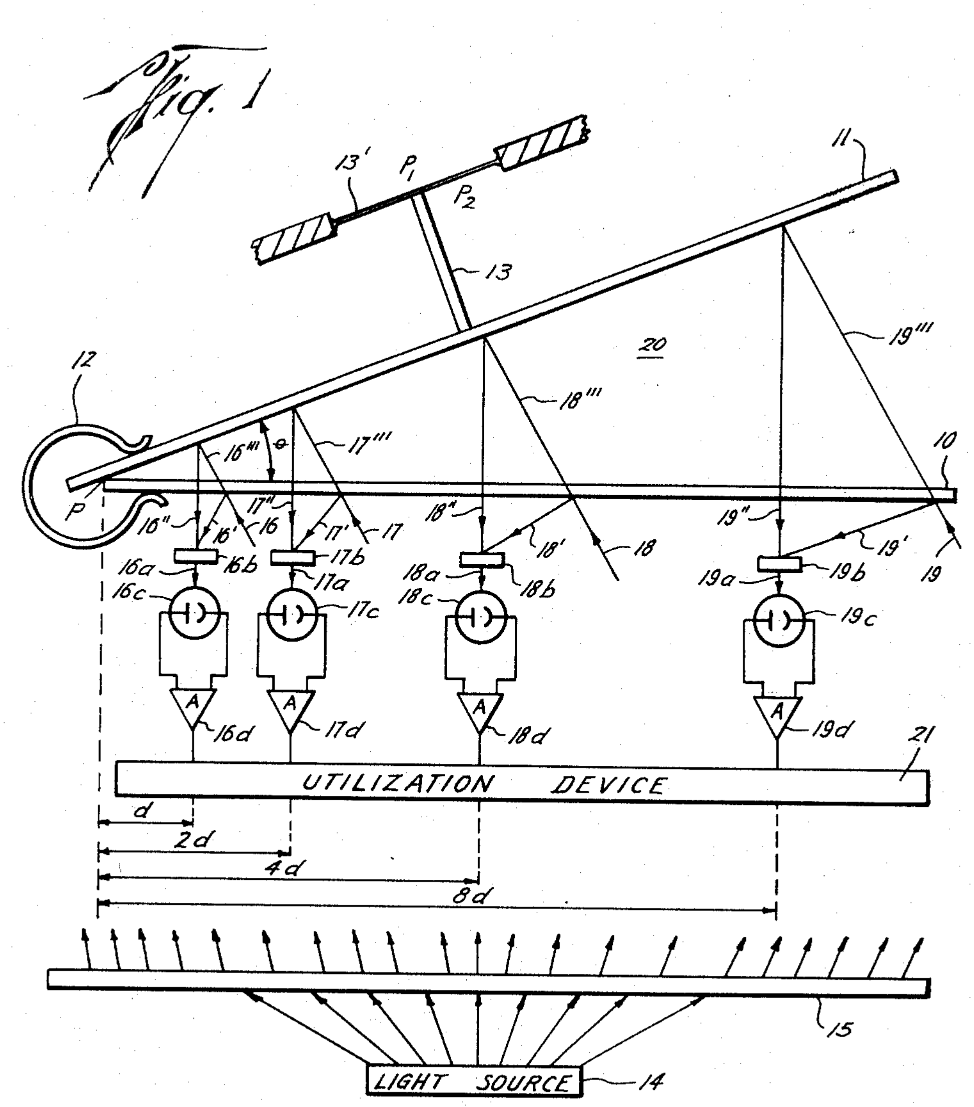

This invention generally relates to a method and apparatus for measuring the displacements of one or more movable members and more particularly to a method and apparatus for providing a continuous digital representation of such displacements. Basically, two widely used methods are employed for representing quantitative information such as voltage, displacement, pressure, pressure, temperature, radiation, frequency, pulse duration, pulse count, etc. The first is the "analog" method which yields a parameter whose amplitude is related to the measured information by some predetermined function; the second is the "digital" method which results in coded groups of digits, or bits, each group corresponding to some instantaneous value of the desired information. Familiar examples of digital codes are the Morse code employed mainly in telegraphy, and the binary code widely used in digital computer installations. Often, however, it is not convenient to encode directly the information as it is received from the primary transducer. As a result one or more preliminary analog-to-analog conversions may be required prior to making the desired analog-to-digital conversion.

Heretofore, various mechanical and optical analog-to-digital converters were employed for this purpose. Generally, such apparatus for digitizing the measured variable analog quantities require a large number of moving mechanical parts, as gears, disks, levers, cams, etc. Because of their relatively great mass, such mechanical parts generally introduce undesirably large inertia effects resulting in appreciable time lag between the input analog quantities and the output digital numbers. Moreover, to achieve workable accuracies, such parts need be machined with great precision thereby greatly adding to the cost of the conversion equipment.

It is an object of the present invention, accordingly, to provide new and improved analog-to-digital converters which are devoid of the above-noted and other apparent deficiencies found in the prior art devices.

Another object of the invention is to provide a new and improved digital encoder in which few or no moving mechanical parts are needed.

Still another object of this invention is to provide a new and improved digital encoder which receives analog quantities corresponding to the measured variables and provides substantially instantaneous output coded electrical signals.

Yet a further object of the invention is to provide a new and improved digital encoder which requires relatively few parts and which is economical to manufacture.

Broadly speaking, these and other objects of the invention are attained by modifying the phase shifts between beams of radiant energy in accordance with the instantaneous values of the input analog quantities, and directing the thusly shifted beams to radiant energy sensing devices for providing coded groups of digital electrical signals.

In a preferred embodiment of the invention, two reflecting surfaces, pivoted about a pivotal line in correspondance with the value of an input analog quantity, are arranged to receive radiant waves, such as light. Depending upon the desired accuracy of resolution, a number of radiant energy sensing devices are suitably disposed adjacent to one of the surfaces; the spacings between the sensing devices are determined in dependence upon the employed code. Thus, the instantaneous intensity of the light reaching each sensing device is a function of its distance to the pivotal line. The combined output of all the sensing devices constitutes a digital representation of the relative displacement between the surfaces and, consequently, of the input analog quantity originally causing such displacement.

The invention may be better understood from the following detailed description, taken in conjunction with the accompanying drawings, in which:

FIG. 1 illustrates schematically encoder apparatus constructed according to the invention; and FIGURES 2–6 are diagrams helpful in explaining the preferred mode of operation of the invention.

Referring now to FIG. 1, the encoder apparatus comprises a wedge-shaped member, generally designated as 20, comprising a pair of reflecting surfaces, such as optically flat mirrors or plates 10 and 11. The plates are hinged at their free ends, as by a biased spring 12, to allow for their rotation about a pivotal line P, as shown. Surface 10 is preferably semi-reflecting and surface 11 totally reflecting. The side of surface 10 facing surface 11 should be of low reflectively to reduce multiple reflections. If it is desired to encode only one input variable X, plate 10 may be stationary, whereas plate 11 is allowed to rotate by an amount corresponding to the value of the input variable. To this end, plate 11 may be connected directly to conventional mechanical transducers, as to accelerometers, force springs, temperature sensing devices, etc., each having a member whose displacements represent magnitudes of the variable X. If desired, plate 11 may also be attached to electromechanical or piezoelectric transducers as, for example, to the moving armature of a solenoid which is energized by electrical signals proportional to the amplitude of the input variable X. For the sake of completeness and simplicity of the drawing, plate 11 is shown to rotate about the pivotal line P in response to the motion of a rigid bar 13 connected to a pressure diaphragm 13' moving up or down in dependence upon the relative values of pressures $P_1$ and $P_2$ on either side thereof; in this instance $X \approx (P_1 - P_2)$. It should be understood that although plate 10 is represented as stationary, it could also be made rotatable about pivotal line P in response to a quantity Y so that the angle $\theta$ between surfaces 10 and 11 would correspond to $(AX-BY)$ where A and B are proportionality constants.

Beams of radiant energy derived, for example, from a light source 14 are directed upon the lower face of plate 10 by means of a conventional type lens system 15. The incident radiant beams are schematically represented for the sake of simplicity as four rays 16–19. For reasons which will become clearer hereinafter, radiant source 14 should preferably provide beams of a single wave length, as monochromatic light which can be obtained, for example, from mercury or sodium lamps typically operated from a 110 volt A.C. supply line or from incandescent lamps with suitable color filters. In order to reduce the effects of refraction and dispersion, better results yet will be achieved if the focussing means 15 is a collimating lens system. Upon reaching the semi-reflecting surface 10, each incident ray is partially reflected. To simplify the description of the apparatus, all rays and parts associated with an incident ray bear the same reference numeral as the ray and are distinguished only by different primes and subscripts. Thus, the partially reflected rays at the surface 10 are denoted as 16'–19'. The remaining portions 16'''–19''' of the incident rays 16–19 reach the reflecting surface 11 and become totally reflected as rays 16''–19''. Since both groups of reflected rays from surfaces 10 and 11 lie in the same plane, they are algebraically added to form resultant rays **16*a*–19*a***. The resultant rays may be directed by means of conventional focussing lens systems 16b–19b upon conventional photosensitive elements, as to photoelectric cells 16c–19c. If a constant intensity light source is employed, the photoelectric cells should preferably be shielded to avoid the surrounding light from reaching them. More conveniently, however, the incident light may be modulated by conventional means, as by applying alternating current to the light source 14 or by mechanically and periodically interrupting the incident beams of light. Depending upon the nature of the incident light employed, the output signals of the photocells are amplified, if needed, either by direct or by alternating current amplifiers 16d–19d. The amplifiers' outputs are coupled to a utilization device 21, such as a digital computer.

The spacing between the photocells is critical and is predetermined by reference to the employed code. Thus, for example, to obtain a cyclic binary Gray code, photocells 16c, 17c, 18c, and 19c are disposed, respectively, at distances d, 2d, 4d and 8d from the pivotal line P.

The photocells receive an amount of light depending upon the relative phase shift, or relative retardation, between the respective partially reflected rays 16′–19′ and the totally reflected rays 16″–19″.

The phase shifts may be measured conveniently by making use of the phenomenon of interference. This phenomenon is based on the principle of superposition which states that the resultant wave of two or more component waves, at any point and at any instant of time, may be found by adding the magnitudes of the electric and magnetic field intensities (vectors) present at that point and at that instant.

The principles underlying the preferred mode of operation of the analog-to-digital encoder of the present invention may be best explained by reference to FIGURES 2–6.

Figure 2:
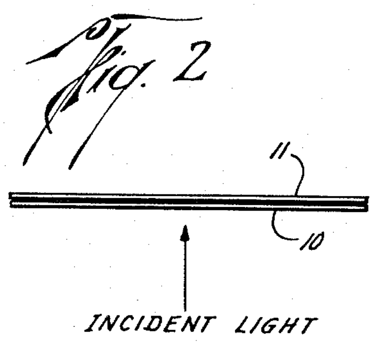

In FIG. 2, the separation between the reflecting surfaces 10 and 11 is assumed to be negligible, that is, the separation is assumed to correspond to a negligibly small fraction of the employed light's wave length; hence, the reflected beam from plate 10 may be considered as being coincident with the reflected beam from plate 11. It can be readily demonstrated that the reflected waves from both surfaces 10–11 cancel each other out; this phenomenon is known as "destructive" interference.

Figure 3:
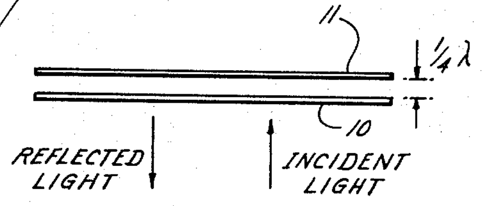
Figure 4:
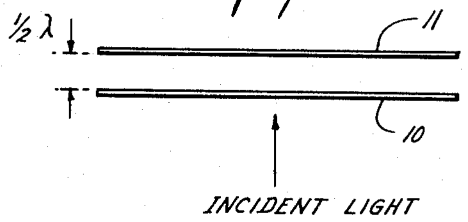

In FIG. 3, the separation between the plates corresponds to a quarter wave length ($\frac{1}{4}\lambda$), consequently, the ray reflected from surface 11 lags behind that reflected from surface 10 by two quarter wave lengths, that is, by a distance equivalent to twice the plates' separation (total path of travel). In this instance the reflected rays from surfaces 10–11 fully reinforce each other, and the intensity of the reflected light is at a maximum. In FIG. 4, the plates' separation is increased to two quarter wave lengths; hence, the reflected ray from surface 11 drops behind that from surface 10 by one full wave length thereby giving rise, as in FIG. 2, to destructive interference. If the separation is increased to three quarter wave lengths, the reflected waves again fully reinforce each other to yield maximum reflected light intensity, and so on. In sum, there is destructive interference (no reflection) whenever the plates' separation is equivalent to $n/2$ wave lengths, where $n$ is zero or an integer, and there is maximum reflection whenever it is equivalent to $m/4$ wave lengths, where $m$ is an odd number.

Figure 5:
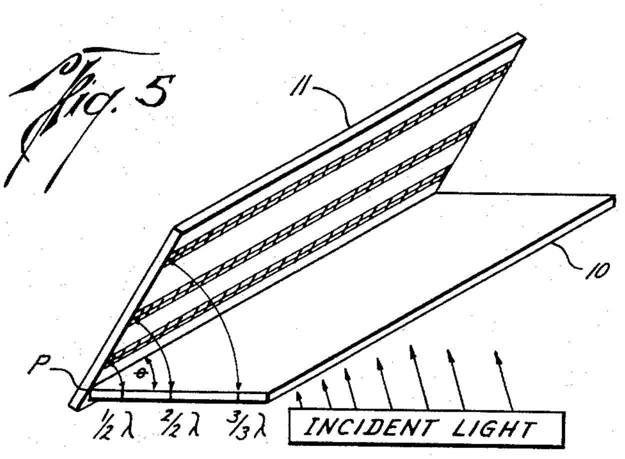

Referring now to FIG. 5, when the two reflecting plates 10–11 form a wedge and are viewed with monochromatic light, the reflected light waves produce interference effects in the form of alternately light and dark bands, or fringes, each parallel to the pivotal line P. At points where the distance between the two reflecting surfaces 10–11 is equal to an odd multiple of a quarter wave length of the employed light, cancellation of the reflected rays occurs. At alternate points where the separation between the plates is an even multiple of a quarter wave length, reinforcement of the reflected rays takes place. As a result, when the angle $\theta$ between the two reflecting surfaces 10–11 is, for example, increased due to an increase in the amplitude of the measured analog quantity X, the fringes move toward the pivotal line P.

Consequently, in FIG. 1, the intensity of the output signal from each of photocells 16c–19c periodically increases and decreases as the angle $\theta$ between plates 10–11 is varied. From the geometry of the wedge-shaped member 20, it is apparent that the change in the distance between the plates at any one point is proportional to the distance of that point to the pivotal line P. Consequently, each of photocells 16c–19c receives light whose intensity has a rate of change which is proportional to the distance separating the particular photocell from the pivotal line P. Since to obtain a binary digital output in the Gray code, the photocells are spaced so that the distance between successive cells increases as the terms of a geometric progression 2, 4, 8, . . ., it will be apparent that when the angle $\theta$ increases from zero to a value which makes the separation between the plates, at a point opposite to photocell 19c, equivalent to two quarter wave lengths, the intensity of the illumination observed by photocell 19c alternately increases and decreases, i.e., it undergoes one complete cycle. The illumination observed by photocell 18c has similar variations but at a reduced rate, i.e., four cycles for every eight cycles observed by photocell 19c. Similarly, the intensity of the light reaching photocells 17c and 16c varies at correspondingly lower rates.

Figure 6:
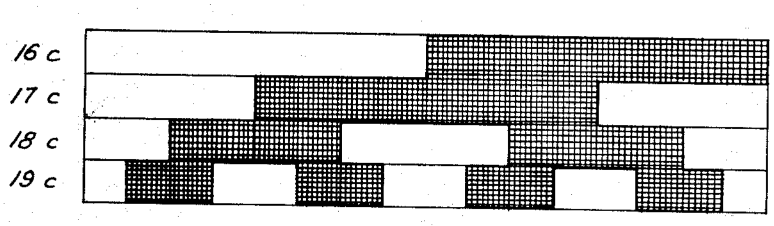

FIG. 6 schematically represents the relative number of light variations observed by each of photocells 16c–19c. When the angular displacementt between surfaces 10 and 11 is such as to cause photocell 16c to produce a single-cycle signal, photocell 19c will have produced an eight-cycle signal. The cross-hatched blocks represent "dark" illumination, whereas the white blocks represent bright illumination. It will be apparent that the combined light intensity variations, as observed at a particular instant of time by photocells 16c–19c, constitute the familiar digital representation in the binary Gray code of a particular angular displacement between plates 10—11, and consequently, of the input quantity X, or of $(AX-BY)$, as previously explained.

The principles of the invention have been described and illustrated with reference to a preferred single embodiment of an optical analog-to-digital converter for the purpose of teaching those skilled in the art how the invention may be practiced. Changes in the components, units, and assemblies will appeal to those skilled in the art, and it is contemplated that such changes may be employed, but yet fall within the spirit and scope of the appended claims.

What is claimed is:

1. An analog-to-digital converter comprising in combination: a wedge-shaped member having two reflecting flat surfaces pivotally joined to allow for their relative displacement about a pivotal line, energizing means impinging radiant energy waves upon said surfaces, actuating means coupled to said member to vary the relative displacement between said surfaces in dependence upon the amplitudes of received analog signals, output means including radiant energy sensing devices disposed adjacent to one of said surfaces, and focussing means placed between said surfaces and said sensing devices to direct the combined reflected radiant energy waves from said surfaces upon said sensing devices, the distance between each of said sensing devices and said pivotal line being dependent upon a predetermined digital code whereby said sensing devices provide output digital signals corresponding to said analog signals.

2. A displacement sensing device comprising in combination: a wedge-shaped member having two flat surfaces pivotally joined to allow for their relative displacement about a pivotal line; energizing means impinging monochromatic light waves upon said surfaces; actuating means coupled to said member to vary the relative displacement between said surfaces in dependence upon the amplitudes of measured analog quantities; and output means including a plurality of photoelectric sensing devices disposed adjacent to said member to receive the combined reflected radiant energy waves from said surfaces and to provide output signals forming groups of binary digits which correspond to said amplitudes, said sensing devices being spaced from said pivotal line in dependence upon the progression in the terms of a binary code.

3. The displacement sensing device of claim 2 in which the spacing between said photoelectric sensing devices varies as a geometric progression.

4. The displacement sensing device of claim 3 in which said light waves are plane polarized.

5. The displacement sensing device of claim 4 in which said output means further include amplifying means coupled to said photoelectric sensing devices and utilization means coupled to the output of said amplifying means.

References Cited by the Examiner

UNITED STATES PATENTS

| | | | |
|---|---|---|---|
| 2,472,348 | 6/49 | Skinner | 340—190 |
| 2,497,042 | 2/50 | Doll | 340—190 |

MALCOLM A. MORRISON, *Primary Examiner.*